US012525153B2

(12) United States Patent
Kreidler

(10) Patent No.: US 12,525,153 B2
(45) Date of Patent: Jan. 13, 2026

(54) FLIP PLACARD

(71) Applicant: J. J. Keller & Associates, Inc., Neenah, WI (US)

(72) Inventor: Jason J. Kreidler, Sheboygan, WI (US)

(73) Assignee: J. J. Keller & Associates, Inc., Neenah, WI (US)

( * ) Notice: Subject to any disclaimer, the term of this patent is extended or adjusted under 35 U.S.C. 154(b) by 104 days.

(21) Appl. No.: 18/680,179

(22) Filed: May 31, 2024

(65) Prior Publication Data

US 2025/0372006 A1 Dec. 4, 2025

(51) Int. Cl.
*G09F 21/04* (2006.01)
*G09F 7/18* (2006.01)

(52) U.S. Cl.
CPC ................ *G09F 21/04* (2013.01); *G09F 7/18* (2013.01); *G09F 2007/1865* (2013.01)

(58) Field of Classification Search
CPC ..... G09F 21/04; G09F 7/18; G09F 2007/1865
See application file for complete search history.

(56) References Cited

U.S. PATENT DOCUMENTS

| | | | | |
|---|---|---|---|---|
| 591,905 | A | | 10/1897 | White |
| 747,188 | A | | 12/1903 | Klee |
| 883,433 | A | | 3/1908 | Utz |
| 947,026 | A | | 1/1910 | Peterson |
| 1,006,270 | A | | 10/1911 | Planert |
| 1,038,280 | A | | 9/1912 | Burnett |
| 1,583,740 | A | | 5/1926 | Palmer |
| 1,727,336 | A | | 9/1929 | Cooper |
| 2,528,990 | A | | 11/1950 | Atwood |
| 3,174,239 | A | | 3/1965 | Cramer |
| 3,455,044 | A | | 7/1969 | Falconbridge et al. |
| 3,481,060 | A | | 12/1969 | Hartz |
| 3,518,782 | A | * | 7/1970 | Long ......................... G09F 7/22 116/28 R |
| 3,544,056 | A | | 12/1970 | Berquist |
| 3,809,352 | A | | 5/1974 | Mathias |
| 4,058,918 | A | * | 11/1977 | Fund ......................... G09F 7/00 40/590 |
| 4,094,083 | A | | 6/1978 | Fund |
| 4,106,229 | A | | 8/1978 | Schmid |
| 4,178,710 | A | | 12/1979 | Schmid |

(Continued)

FOREIGN PATENT DOCUMENTS

| | | | |
|---|---|---|---|
| CA | 3073380 | A1 | 8/2021 |
| EP | 2876629 | A1 | 5/2015 |

*Primary Examiner* — Gary C Hoge
(74) *Attorney, Agent, or Firm* — Wong Meyer Smith & McConnell

(57) ABSTRACT

A flip placard for reducing placard fluttering including a base, a hinge on the base, a plurality of placards having an aperture therein to be mountable about and movable relative to the hinge and a biasing member positioned between the base and the placards for pushing the placards away from the base. The biasing member pushes the placards upward away from the base and toward an exterior portion of the hinge thus providing a force to hold the placards in a fixed portion and eliminate flutter and associated wear of the placards caused by fluttering. The biasing member also enables easier flipping of the placards when changing legends by presenting the placards to a user making the placards easier to flip.

20 Claims, 5 Drawing Sheets

(56) References Cited

U.S. PATENT DOCUMENTS 4,229,891 A 10/1980 Keller
4,436,271 A 3/1984 Manso
4,702,453 A 10/1987 Bishop
4,715,138 A 12/1987 Cherico
4,750,282 A * 6/1988 Zennedjian .............. A47G 1/06 40/792
4,775,128 A 10/1988 Evenson
4,955,153 A 9/1990 Albrecht et al.
4,999,938 A 3/1991 Behling
5,008,661 A 4/1991 Raj
5,375,806 A 12/1994 Debus et al.
D359,253 S 6/1995 Luttrull et al.
5,724,255 A 3/1998 Smith et al.
5,797,578 A 8/1998 Graffeo et al.
5,825,281 A 10/1998 McCreary
5,905,434 A 5/1999 Steffan et al.
6,067,011 A 5/2000 Leslie
6,070,350 A * 6/2000 Fantone .................... G09F 3/20 40/454
6,237,887 B1 5/2001 Banner
6,300,870 B1 10/2001 Nelson
6,304,174 B1 10/2001 Smith et al.
6,590,148 B1 7/2003 Medina
6,665,967 B1 12/2003 Quackenbush
6,688,028 B2 2/2004 Backe
6,785,993 B1 9/2004 Lea
6,839,609 B2 1/2005 Rice
7,083,155 B1 8/2006 Smartt
D534,219 S 12/2006 Seljeseth et al.
7,540,464 B2 6/2009 Samari
7,707,759 B2 5/2010 Roberts
D655,348 S 3/2012 Cooper
8,910,403 B2 12/2014 Nimtz
9,196,164 B1 11/2015 Urmson et al.
9,497,146 B2 11/2016 Chang et al.
10,204,533 B2 2/2019 Kucksdorf et al.
10,410,547 B2 9/2019 Kopelke et al.
11,276,331 B1 3/2022 Kaye et al.
2005/0083183 A1 4/2005 Cao et al.
2005/0150147 A1 7/2005 Berryman
2006/0059745 A1 3/2006 Maqui et al.
2006/0248763 A1 11/2006 Tarabella
2010/0077641 A1 4/2010 Greenwald
2011/0191172 A1 8/2011 Hostvedt et al.
2011/0258895 A1 10/2011 Rodgers, Jr.
2012/0022748 A1 1/2012 Swanson
2012/0091307 A1 4/2012 Haynes
2014/0005860 A1 1/2014 Chance
2014/0043156 A1 2/2014 Howk, Jr.
2014/0081764 A1 3/2014 James
2014/0111323 A1 4/2014 Strout et al.
2014/0126574 A1 5/2014 Trahan et al.
2014/0249913 A1 9/2014 Endo
2014/0257969 A1 9/2014 Topchy et al.
2016/0098756 A1 4/2016 Ayre
2016/0368380 A1 12/2016 Nottingham, Jr.
2017/0140680 A1 5/2017 Kuckdorf et al.
2017/0193883 A1 7/2017 Pal
2018/0374396 A1* 12/2018 Kucksdorf ................ G09F 7/18
2018/0374397 A1 12/2018 Kopelke et al.
2021/0070236 A1* 3/2021 Loree ........................ G09F 7/08

* cited by examiner

FLIP PLACARD

FIELD OF THE INVENTION

The invention relates to a flip placard for use such as on a moving vehicle.

BACKGROUND OF THE INVENTION

At certain vehicle speeds, the placards on a flip placard begin to flutter. This fluttering causes the hinge on the base to wear and thus fail prematurely. The fluttering causes the hinge holes on the placards to wear and thus eventually fail. The fluttering causes scratches and wear on the printed portions of the placards which is made worse when there is any debris trapped between the placards. The legends displayed by the placards are difficult to access since the placards are seated in a recessed pocket on the base with very limited space for a user to get under the placards to change legends to the one desired.

These failures of flip placards have long been accepted by users because it is common to all placard holders of this style. It is conventionally assumed that the weight of the placards combined with the bumps in the road on which the vehicle was traveling were causing the failures.

SUMMARY OF THE INVENTION

In one construction, the disclosure provides a flip placard having a base, a hinge on the base, a plurality of placards having an aperture therein to be mountable about and movable relative to the hinge and a biasing member positioned between the base and the placards for pushing the placards away from the base.

In another construction, the disclosure provides a flip placard having a base, at least one hinge on the base, placards having apertures therein to be mountable about and movable relative to the hinge, at least one securing clip for engaging the placards and at least one biasing member mounted to the base and positioned between the base and the placards for pushing the placards away from the base when the at least one securing clip is engaging the placards.

In another construction, the disclosure provides a flip placard having a base, a hinge on the base, placards having apertures therein to be mountable about and movable relative to the hinge, at least one securing clip for engaging the placards and a foam biasing member mounted to the base adjacent a hinge and positioned between the base and the placards for pushing the placards away from the base when the at least one securing clip is engaging and not engaging the placards.

Other aspects of the disclosure will become apparent by consideration of the detailed description and accompanying drawings.

DETAILED DESCRIPTION OF THE INVENTION

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

Figure 1:
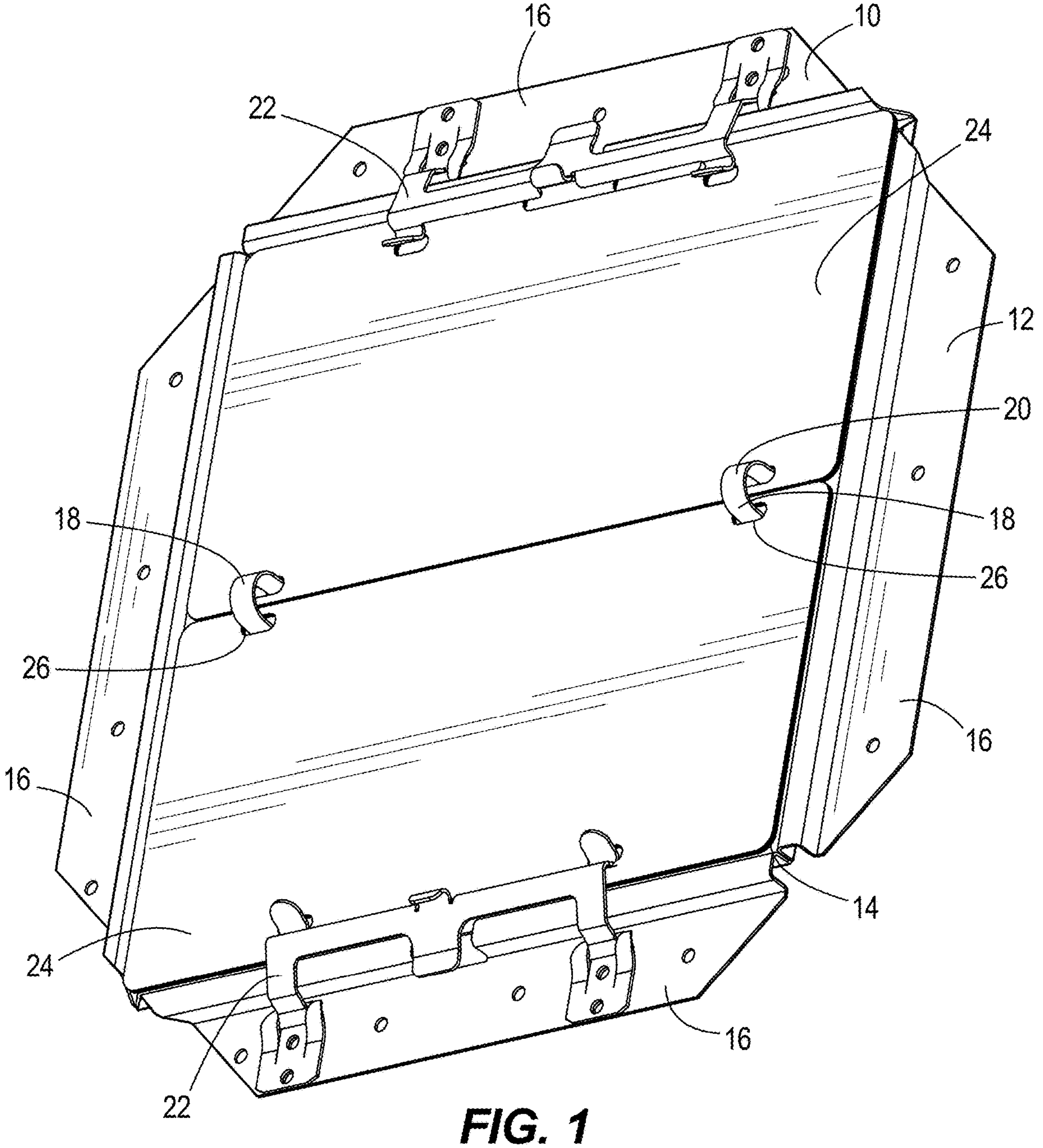
FIG. 1 is a perspective view of a flip placard.
Figure 2:
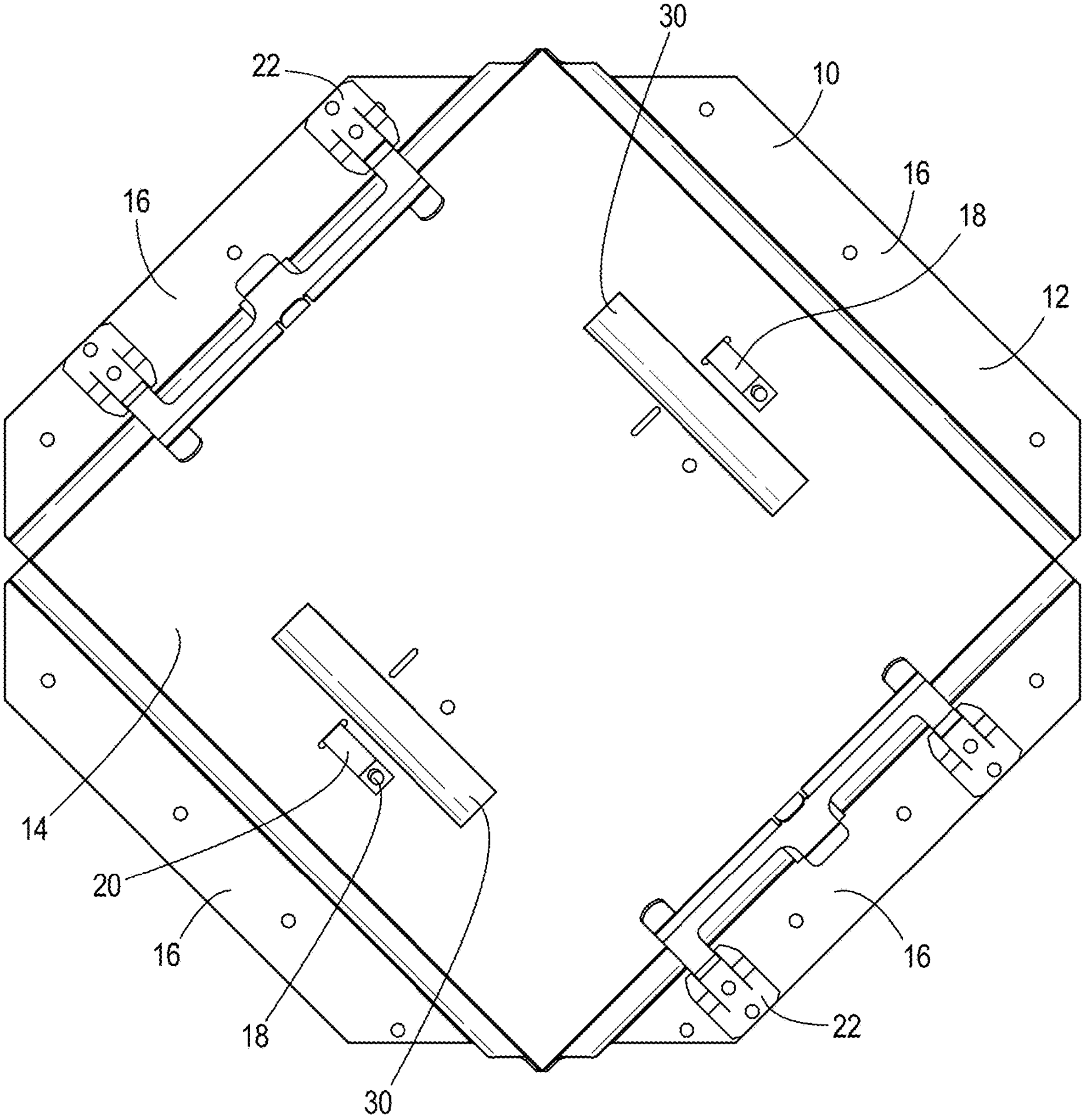
FIG. 2 is a top view of the flip placard with a biasing member installed and placards removed.

As shown in FIG. 1, the flip placard 10 according to the invention includes a base 12 having therein a recess 14 and having one or more flanges 16 to secure the flip placard 10 to a vehicle (not shown) as is known in the art. Two hinges 18 are mounted on the base 12, however, a differing numbers of hinges can also be utilized. Each hinge 18 has an exterior portion 20. Securing clips 22 are mounted on the base 12. As shown, there are two securing clips 22, however, a differing numbers of securing clips 22 can be utilized.

The flip placard 10 includes placards 24 having indicia thereon (not shown) such as printed regulatory information to display a legend between two adjacent placards as is known in the art. Each placard 24 includes apertures 26 that house a respective hinge 18 and allow the placards 24 to be flipped about the hinges 18. The placards 24 are secured when a desired legend is shown using the securing clips 22

To solve the issues regarding placard fluttering, the present invention includes a biasing member 30. As shown in FIGS. 2-6, the biasing member 30 in one embodiment is positioned in the recess 14 of the base 12 such that the biasing member 30 is positioned between the placards 24 and the base 12. The biasing member 30 pushes the placards 24 upward away from the base 12 and toward the exterior portion 20 of the hinges 18 thus providing a force to hold the placards 24 in a fixed portion and eliminate flutter and associated wear of the placards 24 caused by the fluttering. The biasing member 30 enables easier flipping of the placards 24 during changing of the legend by the user. When the securing clips 22 are released, the biasing member 30 pushes the placards 24 away from the base 12 and presents the placards 24 to a user making the placards 24 easier to flip when changing legends. Two biasing members 30 are shown, however, a different number can be utilized.

Figure 3:
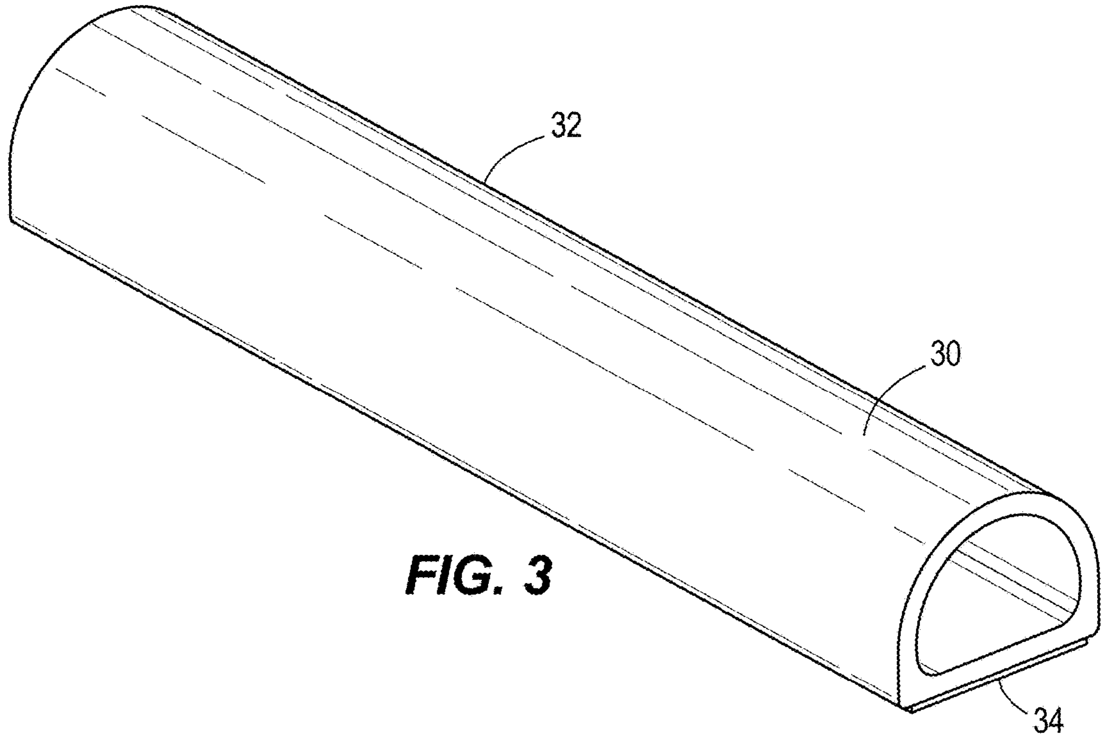
FIG. 3 is a perspective view of the biasing member.
Figure 4:
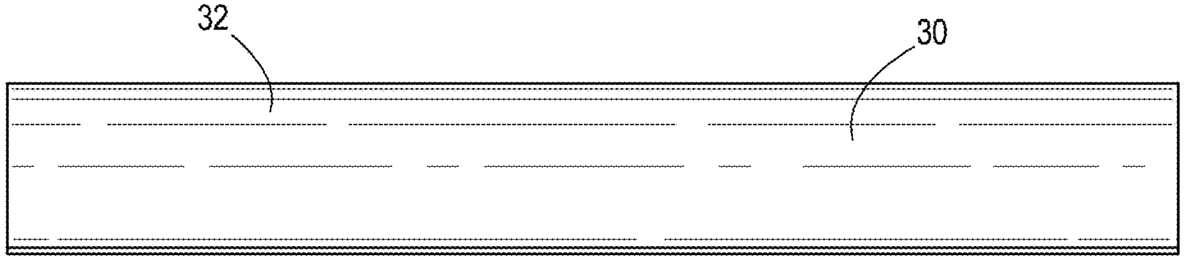
FIG. 4 is a side view of the biasing member.
Figure 5:
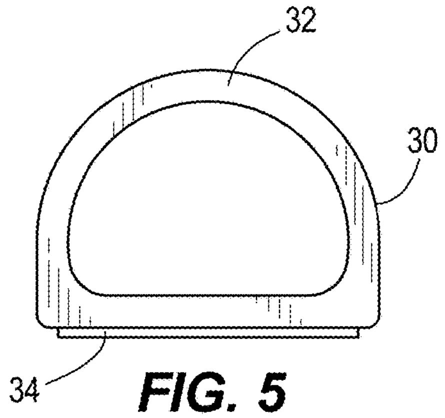
FIG. 5 is an end view of the biasing member.
Figure 6:
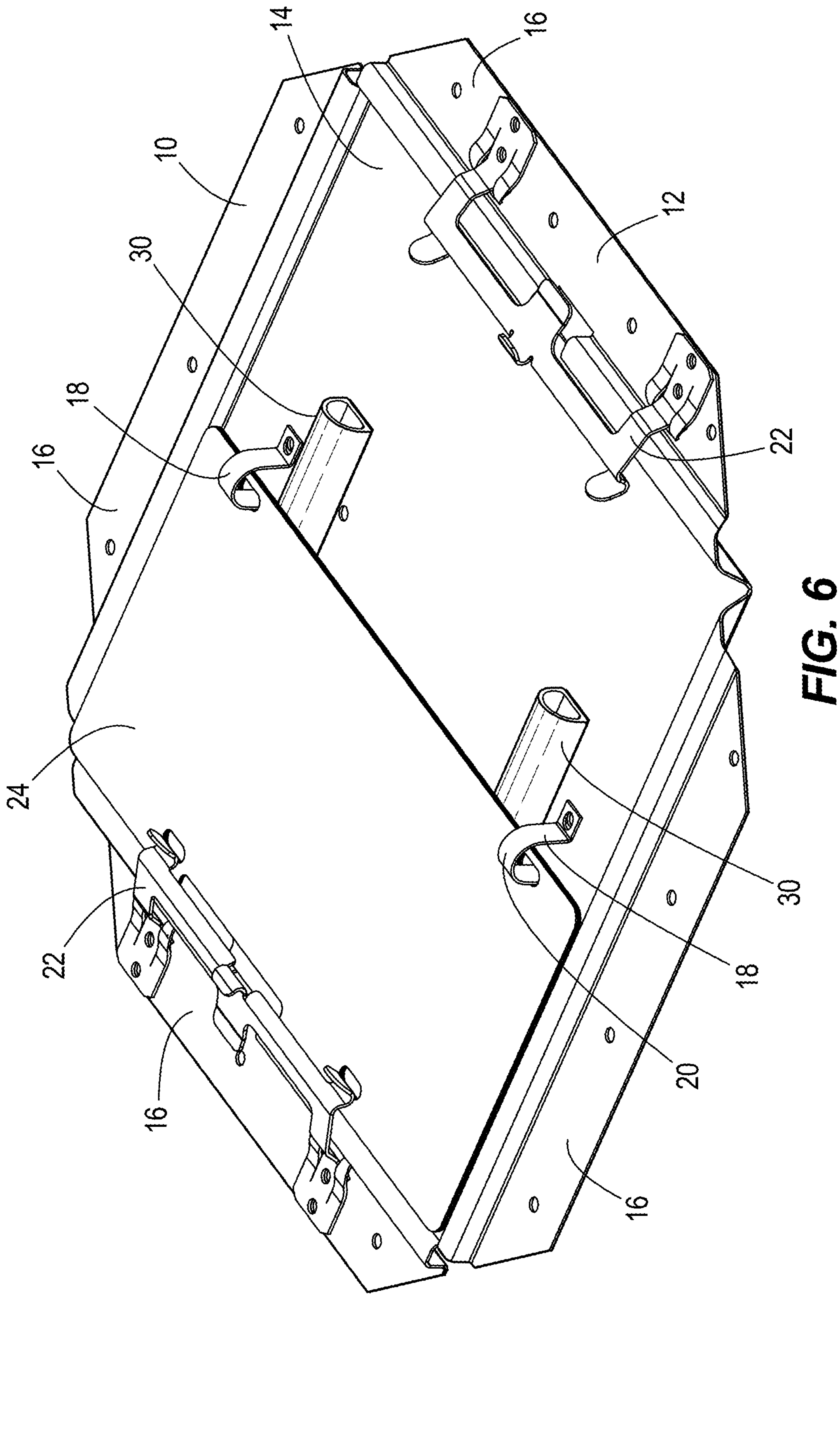
FIG. 6 is a top view of the flip placard with the biasing member installed.

As shown in FIGS. 3-5, the biasing member 30 is an elongate semi-circular cylinder 32 with a flat face 34 mountable to the base 12 such as by an adhesive. Other shapes and mounting methods can also be utilized to bias the placards 24 and secure the biasing member 30 to the base 12. The biasing member 30 can be fabricated of rubber or foam such as an EPDM sponge rubber seal available from Trim-Lok as a D shaped rubber seal 135 series with self-adhesive tape, however, other materials and configurations can also be utilized such as a silicone seal or other materials that offers the correct compliance and depth.

Figure 7:
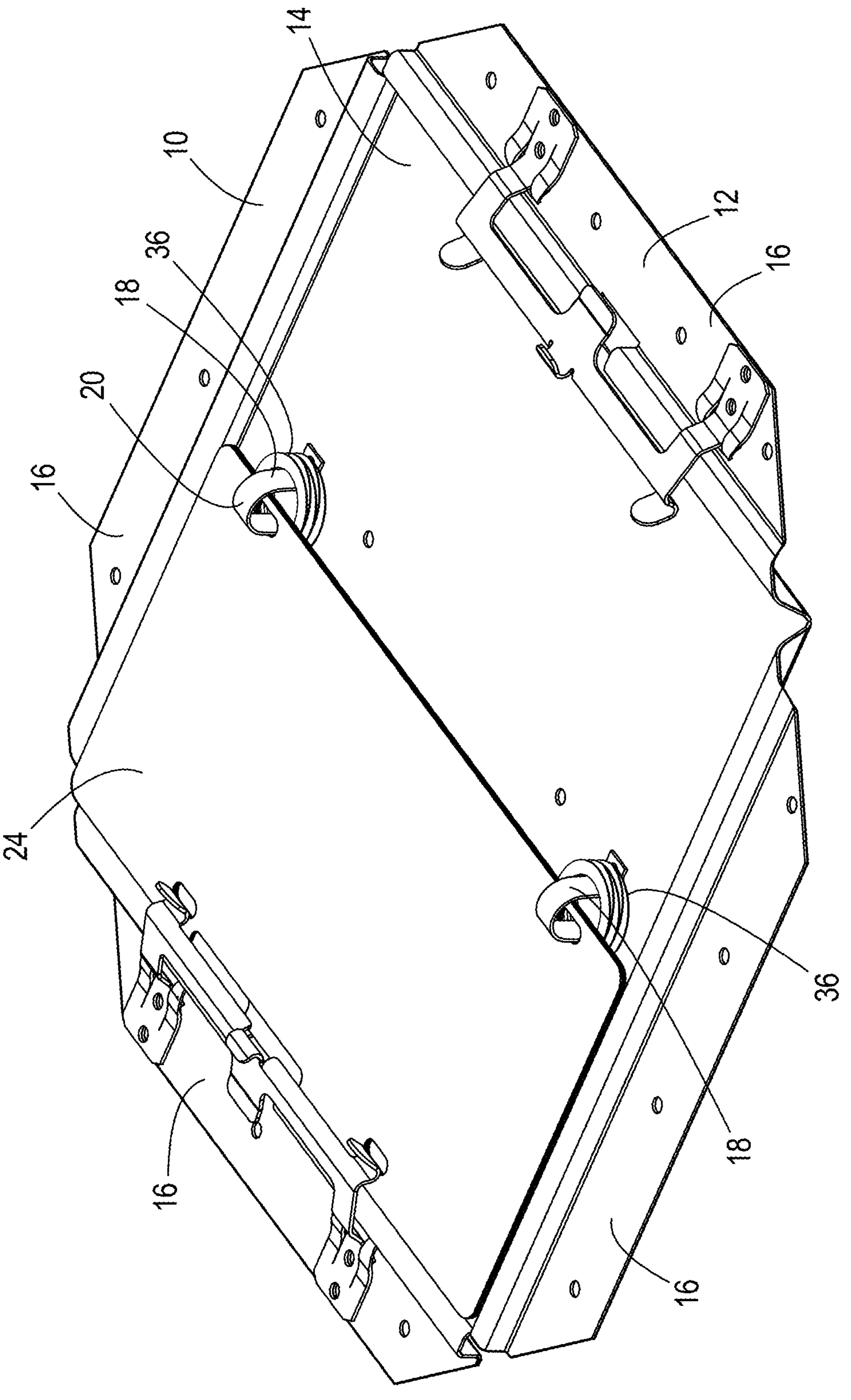
FIG. 7 is perspective view of the flip placard with a second embodiment of the biasing member installed.

A second embodiment of a biasing member 36 is shown in FIG. 7. The biasing member 36 is positioned about one or more of the hinges 18 so that the biasing member 36 is in between the base 12 and the placards 24. As shown, the biasing member 36 can be a flat spring such as corrosion-resistant stacked wave disc spring available from McMaster-Carr, however, other biasing members 36 can be utilized around the hinges 18 or placed anywhere along the intersection of the two placards 24.

It should be noted that other types of biasing members in addition to the cylinder 32 and the spring 36 can also be utilized with this invention.

Various features and advantages of the invention are set forth in the following claims.

What is claimed is:

1. A flip placard comprising:

a base;

a hinge on the base;

a plurality of placards having an aperture therein to be mountable about and movable relative to the hinge; and a biasing member positioned between the base and the placards for pushing the placards away from the base.

2. The flip placard of claim 1 wherein the biasing member is secured to the base.

3. The flip placard of claim 1 wherein the biasing member is fabricated of foam.

4. The flip placard of claim 1 wherein the biasing member is semi-circular in cross section.

5. The flip placard of claim 1 wherein the biasing member is positioned adjacent the hinge.

6. The flip placard of claim 1 wherein the biasing member is a flat spring.

7. The flip placard of claim 1 wherein the base includes a recess that houses the placards.

8. The flip placard of claim 1 wherein the hinge has an exterior portion and wherein the biasing member pushed the placards toward the exterior portion.

9. The flip placard of claim 1 wherein the biasing member provides a force to the placards to hold the placards in a fixed position while the flip placard is in motion.

10. A flip placard comprising:

a base;

at least one hinge on the base;

placards having apertures therein to be mountable about and movable relative to the hinge;

at least one securing clip for engaging the placards; and at least one biasing member mounted to the base and positioned between the base and the placards for pushing the placards away from the base when the at least one securing clip is engaging the placards.

11. The flip placard of claim 10 wherein the at least one biasing member is mounted to the base with adhesive.

12. The flip placard of claim 11 wherein the at least one biasing member is positioned adjacent the hinge.

13. The flip placard of claim 11 wherein the at least one biasing member is semi-circular in cross section.

14. The flip placard of claim 11 wherein the at least one biasing member is fabricated of foam.

15. The flip placard of claim 11 herein the at least one biasing member is fabricated of foam weather stripping.

16. The flip placard of claim 11 and further including a second biasing member.

17. A flip placard comprising:

a base;

a hinge on the base;

placards having apertures therein to be mountable about and movable relative to the hinge;

at least one securing clip for engaging the placards; and a foam biasing member mounted to the base adjacent a hinge and positioned between the base and the placards for pushing the placards away from the base when the at least one securing clip is engaging and not engaging the placards.

18. The flip placard of claim 17 wherein the foam biasing member includes a flat surface mounted to the base.

19. The flip placard of claim 17 wherein the foam biasing member is semi-circular in cross-section.

20. The flip placard of claim 17 and further including a second foam biasing member.

* * * * *